United States Patent
Stephens et al.

(10) Patent No.: US 9,743,303 B2
(45) Date of Patent: Aug. 22, 2017

(54) METHODS AND ARRANGEMENTS FOR BEAMFORMING REPORTS IN WIRELESS NETWORKS

(71) Applicant: Intel Corporation, Santa Clara, CA (US)

(72) Inventors: Adrian P. Stephens, Cambridge (GB); Thomas J. Kenney, Portland, OR (US); Eldad Perahia, Portland, OR (US); Minyoung Park, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 13/730,914

(22) Filed: Dec. 29, 2012

(65) Prior Publication Data

US 2014/0044112 A1 Feb. 13, 2014

Related U.S. Application Data

(60) Provisional application No. 61/682,054, filed on Aug. 10, 2012.

(51) Int. Cl.
*H04B 7/02* (2006.01)
*H04W 24/10* (2009.01)
(Continued)

(52) U.S. Cl.
CPC .......... *H04W 24/10* (2013.01); *H04B 7/0617* (2013.01); *H04B 7/0643* (2013.01); *H04W 16/28* (2013.01)

(58) Field of Classification Search
CPC .............................. H04W 84/12; H04W 88/08
(Continued)

(56) References Cited

U.S. PATENT DOCUMENTS 7,929,486 B2 * 4/2011 Karaoguz et al. ............ 370/328
2007/0253501 A1 11/2007 Yamaura
(Continued)

FOREIGN PATENT DOCUMENTS

KR 10-2009-0031434 A 3/2009
KR 10-2010-0084465 A 7/2010
WO 2014/025476 A1 2/2014

OTHER PUBLICATIONS

International Search Report and Written Opinion received for PCT patent application No. PCT/US2013/048815, mailed on Sep. 26, 2013, 11 pages.
(Continued)

*Primary Examiner* — Yemane Mesfin
*Assistant Examiner* — Abdelillah Elmejjarmi
(74) *Attorney, Agent, or Firm* — Schubert Law Group PLLC (57) ABSTRACT

Logic of an access point may transmit a null data packet for beamforming training and transmit a beamforming report poll to the first station on a user list before receiving a transmission from the first station on the user list. Logic may wait for a timeout period to determine whether the first station on the user list will respond to the null data packet prior to transmitting the beamforming report poll. Logic may receive from the first station an indication that the first station is a slow beamforming report responder. Logic may reorder the user list to position a fast beamforming responder as the first station. And logic of the station may determine that the station is unable to complete and transmit the report so the logic may wait to transmit the beamforming report in response to a subsequent beamforming report poll frame.

15 Claims, 5 Drawing Sheets

(51) Int. Cl.
*H04B 7/06* (2006.01)
*H04W 16/28* (2009.01)

(58) Field of Classification Search
USPC .................................................. 370/338, 328
See application file for complete search history.

(56) References Cited

U.S. PATENT DOCUMENTS

| | | |
|---|---|---|
| 2009/0121951 A1 | 5/2009 | Kaneda |
| 2009/0232109 A1 | 9/2009 | Nandagopalan et al. |
| 2009/0318091 A1 | 12/2009 | Wang et al. |
| 2011/0128947 A1* | 6/2011 | Liu .................. H04L 25/03343 370/338 |
| 2012/0263126 A1* | 10/2012 | Choi .................... H04B 7/0617 370/329 |

OTHER PUBLICATIONS

International Preliminary Report on Patentability received for PCT patent application No. PCT/US2013/048815, mailed on Feb. 10, 2015, 7 pages.

* cited by examiner

METHODS AND ARRANGEMENTS FOR BEAMFORMING REPORTS IN WIRELESS NETWORKS

BACKGROUND

Embodiments are in the field of wireless communications. More particularly, the present disclosure relates to communication of beamforming reports.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

One of the issues for 802.11ah wireless networks is that during beamforming frame exchange sequences, the first station/user in a user list of a null data packet (NDP) announcement frame has very little time to prepare a beamforming report, which may comprise channel information representing of the state of the measured radio channel between the first station and the access point. After the NDP announcement packet is transmitted, a NDP is transmitted, which can act as a trigger to initiate the generation and transmission of the beamforming report from the first station in the user list to the access point. The NDP is a special PHY packet that contains training fields suitable to allow the radio channel to be evaluated by stations. The reason that the first station has very little time to prepare the beamforming report is attributable in part to the fact that, in 802.11ah networks, the NDP has a much shorter preamble than in networks such as, for example, those compliant with 802.11ac or 802.11n. The second and subsequent stations, however, have plenty of time. Using stations having processors with higher MIPs (Million Instructions Per second) would not necessarily and in all cases, address this issue because one class of stations targeted for 802.11ah systems includes low-cost, low-power sensors that must employ lower MIPs processors.

Embodiments relate frame exchange sequences for beamforming training with multiple stations. In many embodiments, logic of an access point may transmit a packet that contains training fields to allow the channel to be determined by its stations, such as an NDP and transmit a beamforming report poll to the first station to retrieve channel information determined by the first station on a user list before receiving a transmission from the first station on the user list. In several embodiments, the access point may receive a beamforming report containing the channel information determined by the first station in response to the beamforming report poll. In some embodiments, the logic may wait for a timeout period to determine whether the first station on the user list will respond to the null data packet prior to transmitting the beamforming report poll. In many embodiments, the logic may store an indication that the first station on the user list is a slow beamforming report responder if the first station does not respond before the expiration of the timeout period. In further embodiments, the logic may receive an indication from the first station indicating that the first station is a slow beamforming report responder during association between the access point and the first station. In several embodiments, the logic may reorder the user list to position a fast beamforming report responder as the first station in the user list or at least to remove a slow beamforming report responder from the position as the first station on the user list.

In many embodiments, logic of a station may generate and transmit an association request frame with an extended capabilities information element comprising a slow beamforming report responder bit to indicate whether or not the station is a slow beamforming report responder. In some embodiments, a station that does not identify itself as a slow beamforming report responder may be presumed to be a fast beamforming report responder.

In some embodiments, the logic of the station may receive a null data packet announcement comprising a user list of the stations from which the access point will request beamforming reports. After receiving the NDP announcement, the logic may receive an NDP.

In some embodiments, the NDP is a trigger frame to request that the first station in the user list of the preceding NDP announcement transmit a beamforming report to the access point. In such embodiments, the logic of the station may determine at this particular time that the station is unable to complete and transmit the beamforming report so the logic may wait to generate the beamforming report and then transmit the beamforming report in response to a subsequent beamforming report poll frame received from the access point.

In other embodiments, the station may ignore that NDP for the purpose of causing a Beamforming report to be generated. In such embodiments, the logic may receive a beamforming report poll frame from the access point and respond to the beamforming report poll with a transmission of the beamforming report.

In some embodiments, the transmission of the NDP announcement signals the stations (STAs) to calculate a beamforming report, and informs the first station (user) in a list of users in the NDP Announcement to transmit a Beamforming Report after the transmission of a the NDP.

A "slow" STA may be defined a STA that is unable to respond to an NDP with a beamforming report including channel state information (CSI) feedback within short interframe space (SIFS) after the NDP.

Various embodiments may be designed to address different technical problems associated with beamforming training. For instance, some embodiments may be designed to address one or more technical problems such as facilitating a slow beamforming report responder as a first station in a user list in the NDP announcement.

Different technical problems such as those discussed above may be addressed by one or more different embodiments. For instance, some embodiments that facilitate a slow beamforming report responder as a first station in a user list of stations may do so by one or more different technical means such as identifying a slow beamforming report responder during association and avoiding the placement of the slow beamforming report responder as the first station in the user list, keeping records of slow and fast responders, generating a beamforming report poll between transmission of the NDP and receipt of the beamforming report from the slow beamforming report responder, allowing the slow beamforming report responder to respond to any beamforming report poll, transmitting a beamforming report poll to the slow beamforming report responder if the slow beamforming report responder does not respond to a null data packet within a timeout period, and the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standardsleee.org/getieee802/download/802.11-2012.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
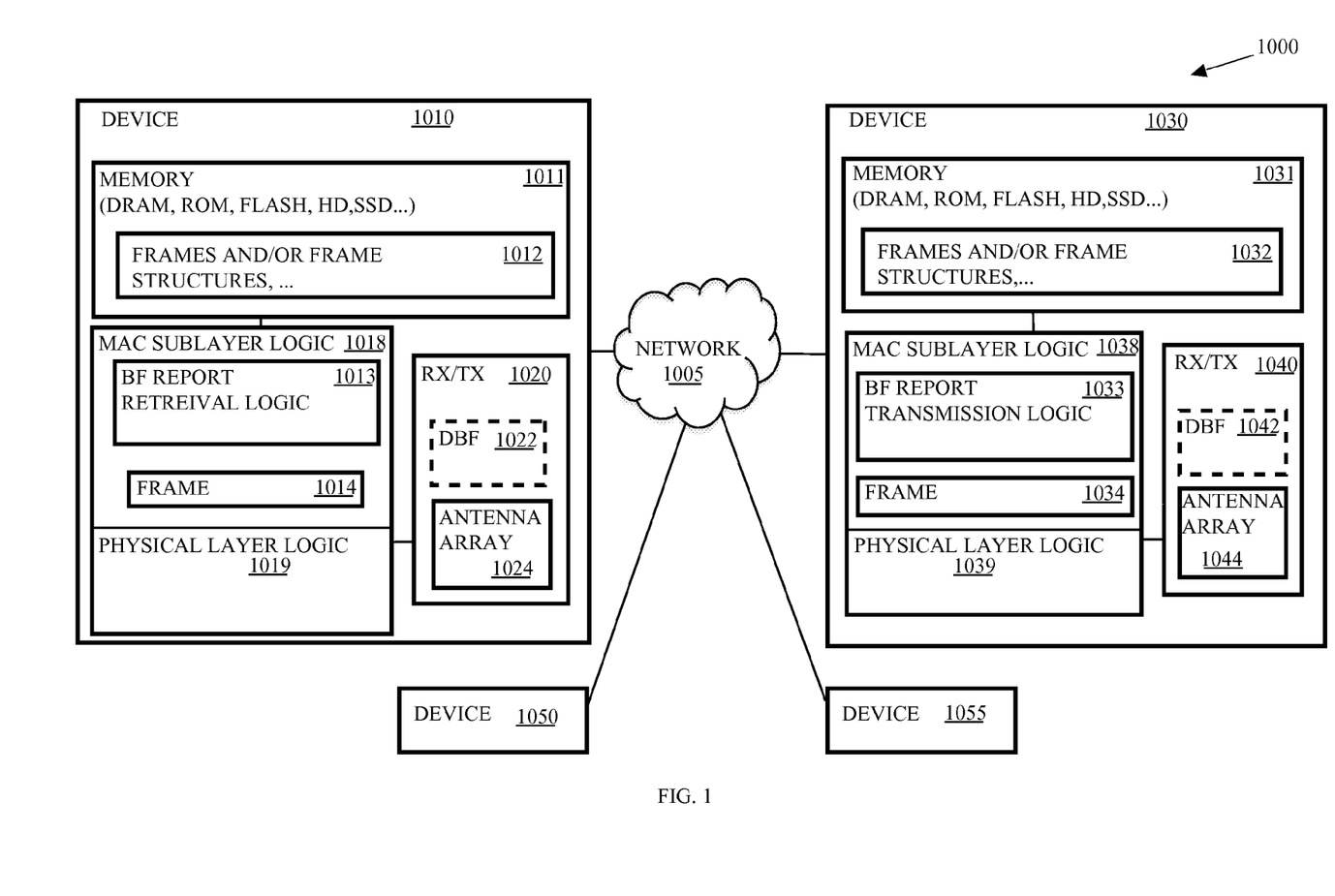
FIG. 1 depicts an embodiment of a wireless network comprising a plurality of communications devices.

Turning now to FIG. 1, there is shown an embodiment of a wireless communication system 1000. The wireless communication system 1000 comprises a communications device 1010 that may be wire line and wirelessly connected to a network 1005.

The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1010 may transmit beacons periodically to notify the communications devices 1030, 1050, and 1055 of the services offered by the communications device 1010. The communications devices 1030, 1050, and 1055 may at different times or close to the same time request association with the communications device 1010. In the association request from each of the communications devices 1030, 1050, and 1055, the communications devices 1030, 1050, and 1055 may include an extended capabilities information element. The extended capabilities information element may comprise a slow beamforming report responder bit to indicate whether or not the communications device is a slow beamforming report responder. Beamforming report retrieval logic 1013 of the communications device 1010 may receive and store indications of slow beamforming report responders in the memory 1011 of the communications device 1010. In further embodiments, the beamforming report transmission logic 1033 of the communications device 1030, for example, may include the slow beamforming report responder bit in a probe frame or the like. In some embodiments, if the beamforming report transmission logic 1033 does not set the slow beamforming report responder bit or does not include the capability in a communication with the communications device 1010, the communications device 1010 may determine that the communications device 1030 is a fast beamforming report responder.

Thereafter, the beamforming report retrieval logic 1013 may generate a user list of stations including the communications devices 1030, 1050, and 1055 from which to obtain beamforming reports. In many embodiments, when creating a list of stations to participate in a beamforming exchange, if not all users are slow, the beamforming report retrieval logic 1013 may put one of the fast responder stations in first position in the user list and communicate the user list via the NDP announcement frame. Placing one of the fast responder stations in first position in the user list may avoid extra overhead associated with slow beamforming report responder stations.

If, however, all responder stations are slow or the beamforming report retrieval logic 1013 does not otherwise place a fast beamforming report responder in the position of the first station in the user list, the beamforming report retrieval logic 1013 may transmit a beamforming report poll to the first responder station on the user list. The beamforming report retrieval logic 1013 may transmit the beamforming report poll, e.g., a short interframe space (SIFS) after transmitting the NDP. The beamforming report retrieval logic 1013 may transmit the beamforming report poll after transmitting the NDP instead of waiting for a beamforming report from the slow beamforming report responder station such as the communication device 1030.

Note that, although the description of this example mentions multiple stations, embodiments encompass within their scope a basic service set (BSS) including a single responder station, in which case the beamforming report retrieval logic 1013 may keep a record of whether that one station is fast or slow. In such a case, the station may still be considered a first responder station or, in other words, the first station in the user list.

In many embodiments, logic of the slow first responder station, the beamforming report transmission logic 1033, may gain additional time to generate and transmit a beamforming report to the beamforming report retrieval logic 1013 by transmitting the beamforming report after the beamforming report retrieval logic 1013 transmits the beamforming report poll. In further embodiments, the communications device 1030 may gain the additional time by, e.g., being pushed back in the queue of the user list in the NDP announcement frame behind one or more fast responder stations.

In several embodiments, a slow responder station such as the communications device 1030, after receipt of the NDP, may ignore the position of its address as the first user address in the user list in the NDP announcement frame user field. The communications device 1030 may ignore this by not generating a beamforming report after the NDP. Instead, the beamforming report transmission logic 1033 may respond to any beamforming report poll frame regardless of its position in the user list, or the NDP announcement frame user field. In other words, the beamforming report transmission logic 1033 waits until after receipt of a beamforming report poll frame before generating and transmitting the beamforming report to the communications device 1010.

In further embodiments, the communications devices 1030, 1050, and 1055 may or may not indicate that they are slow responders with a slow beamforming report responder bit. For instance, the communications device 1010 may remain unaware of which communications devices are slow responders, at least initially. In such embodiments, if the beamforming report retrieval logic 1013, after having transmitted an NDP announcement frame and an NDP, does not receive a start of frame at the expected time such as within a timeout period, the beamforming report retrieval logic 1013 may assume that the first responder station, the communications device 1030, is a slow responder and will generate a beamforming report poll and transmit the beamforming report poll to the communications device 1030 to collect the response. If there is no response to the beamforming report poll frame from the communications device 1030, the beamforming report retrieval logic 1013 may assume the communications device 1030 did not receive the NDP announcement and make no further attempts to poll the communications device 1030 during this beamforming exchange sequence. In many embodiments, the beamforming report retrieval logic 1013 may instead poll the next station indicated in the user list on the NDP announcement frame.

In such embodiments, if the communications device 1030 is the first station in the user list and is a slow responder station or cannot otherwise prepare the beamforming report in time to transmit the beamforming report to the communications device 1010 during the timeout period, the beamforming report transmission logic 1033 may transmit nothing within the timeout period after transmission of the NDP. Instead, the beamforming report transmission logic 1033 may respond to any beamforming report poll frame regardless of its position in the user list of the NDP Announcement. In other words, the beamforming report transmission logic 1033 may wait until after receipt of a beamforming report poll frame from the beamforming report retrieval logic 1013 before generating the beamforming report to transmit to the communications device 1010.

If the first responder station is a fast responder station, however, the fast responder station may generate and transmit a beamforming report after the NDP within the timeout period.

In still further embodiments, the beamforming report retrieval logic 1013 may attempt to learn "slow responder" behavior by observing how often a given station such as the communications device 1030 generates a slow or delayed response. Based on this information the beamforming report retrieval logic 1013 may reorder the user list in the NDP announcement frame to avoid making a "learned slow responder" the first station in the user list. However, in many embodiments, the beamforming report retrieval logic 1013 may not depend on perpetuation of this behavior, and, in many embodiments, may not generate a beamforming report poll for a "learned slow responder" without first observing the expiration of the timeout period after transmission of the NDP. The timeout period may, for example, be a short interframe space (SIFS) or other interframe space.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as structures for an association request frame, an association response frame, a probe frame, an NDP announcement frame, a beamforming report poll, a beamforming report, and the like.

The MAC sublayer logic 1018, 1038 may comprise logic to implement functionality of the MAC sublayer of the data link layer of the communications device 1010, 1030. The MAC sublayer logic 1018, 1038 may generate the frames such as NDP announcement frames and the physical layer logic 1019, 1039 may generate physical layer protocol data units (PPDUs) based upon the frames as well as the NDPs in response to instructions to transmit the NDPs from the MAC sublayer logic 1018. For example, the frame builder may generate frames 1014, 1034. The physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 1A:
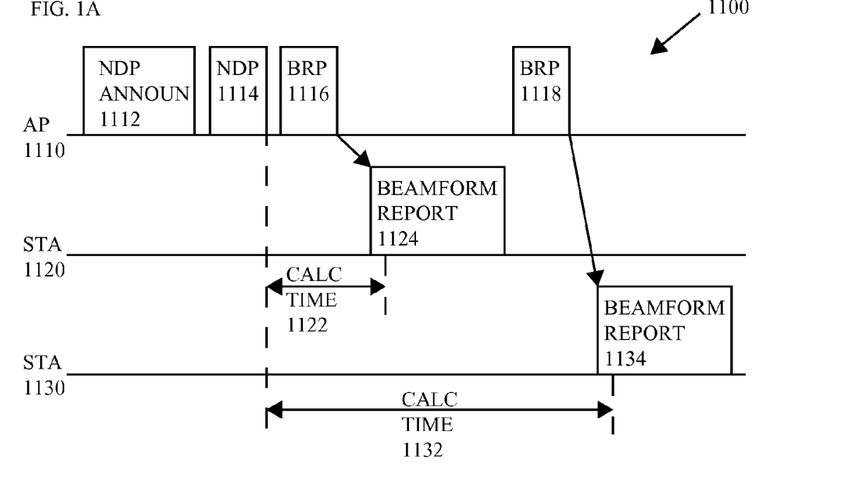
FIGS. 1A-C depict embodiments of frame exchange sequences for beamforming training as well as a signaling bit to indicate that a station may be a slow beamforming report responder.
Figure 1B:
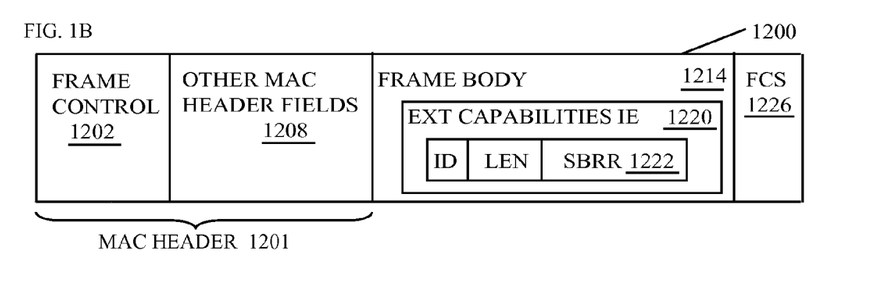
Figure 1C:
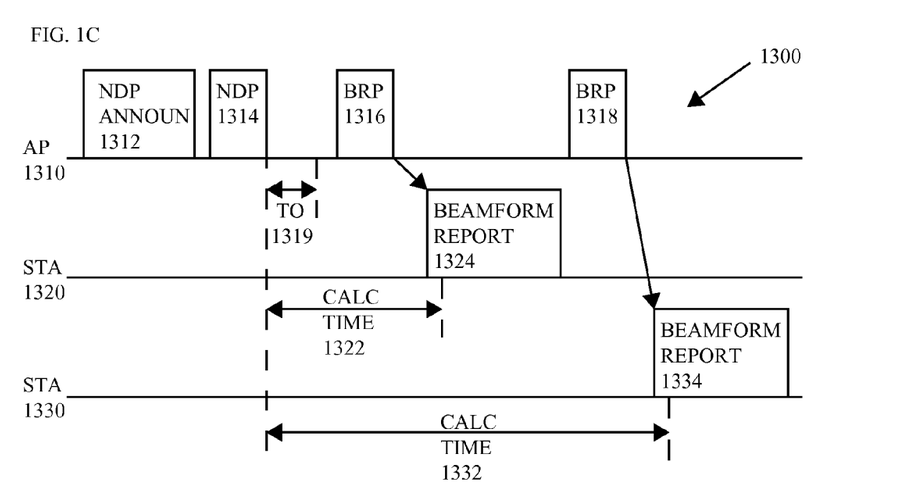

FIGS. 1A-C depict embodiments of frame exchange sequences for beamforming training as well as a signaling bit to indicate that a station may be a slow beamforming report responder. In particular, FIG. 1A illustrates a frame exchange sequence 1100 for beamforming training between an access point (AP) 1110, a station (STA) 1120, and a STA 1130. The AP 1110 begins by transmitting a null data packet (NDP) announcement frame 1112. The NDP announcement frame 1112 is transmitted to the STAs 1120 and 1130 to indicate that the beamforming sequence is beginning, the order of the stations' responses are in accordance with a user list included in the NDP announcement frame 1112, the type of feedback requested in the beamforming reports, and the NDP is about to be transmitted for calculation of the beamforming reports. The AP 1110 may then transmit the NDP 1114. In the present embodiment, the NDP 1114 may be a physical layer (PHY) frame transmitted for evaluating the channel and calculating the beamforming reports so MAC logic of the AP 1110 may instruct the PHY logic of the AP 1110 to generate and transmit the NDPs.

After the transmission of the NDP 1114, the STAs 1120 and 1130 may begin to calculate their respective beamforming reports. The calculation time 1122 indicates the amount of time that the STA 1120 has to calculate the beamforming report 1124 and the calculation time 1132 illustrates the amount of time that STA 1130 has to calculate the beamforming report 1134.

After transmitting the NDP 1114, the AP 1110 may transmit a beamforming report poll 1116 to the STA 1120 to trigger transmission of the beamforming report 1124. The STA 1120 may transmit the beamforming report 1124 and then the AP 1110 may transmit a beamforming report poll 1118 to the STA 1130 to trigger transmission of the beamforming report 1134. Thereafter, the STA 1130 may transmit the beamforming report 1134.

FIG. 1B illustrates an embodiment of a management frame 1200 such as an association request/response frame or a probe request/response frame generated by MAC logic such as the MAC sublayer logic 1013 and 1033 in FIG. 1. In other embodiments, the frame 1060 may have more or less fields, different fields, and/or fields with different field lengths. In the embodiment illustrated in FIG. 1B, the frame 1200 comprises a MAC header 1201 followed by a frame body field 1214 and a frame check sequence (FCS) field 1226.

The MAC header 1061 may comprise the frame control field 1202 and other header fields 1208. The other header fields 1208 may comprise, e.g., a duration/identifier field, address fields, a Sequence Control field, and a quality of service control field. The frame control field 1062 may be two octets and may identify the type and subtype of the frame such as a management type and an association request subtype.

The frame body 1214 may include data elements, control elements, or parameters and capabilities. In the present embodiment, the frame body 1214 comprises an extended capabilities information element (IE) 1220. The extended capabilities IE 1220 carries information about the capabilities of an IEEE 802.11 STA, intended to augment the Capability Information field (CIF). In the present embodiment, the extended capabilities IE 1220 comprises a slow beamforming report responder (SBRR) bit 1222 as well as other bits such as bits for 20/40 BSS Coexistence Management Support, Extended Channel Switching, PSMP Capability, S-PSMP Support, Event, Diagnostics, Multicast Diagnostics, Location Tracking, FMS, Proxy ARP Service, Collocated Interference Reporting, Civic Location, Geospatial location, TFS, WNM-Sleep Mode, TIM Broadcast, BSS Transition, QoS Traffic Capability, AC Station Count, Multiple BSSID and others. In many embodiments, the slow beamforming report responder (SBRR) bit 1222 may be set to indicate that a station is a slow beamforming report responder.

The FCS field 1086 may be four octets and may include extra checksum characters added to the frame 1060 for error detection and correction such as a cyclic redundancy check value.

FIG. 1C illustrates a frame exchange sequence 1300 for beamforming training between an access point (AP) 1310, a station (STA) 1320, and a STA 1330. The AP 1310 begins by transmitting a null data packet (NDP) announcement frame 1312. The NDP announcement frame 1312 is transmitted to the STAs 1320 and 1330 to indicate that the beamforming sequence is beginning, the order of the stations' responses, the type of feedback requested in the beamforming reports, and the NDP is about to be transmitted for calculation of the beamforming reports. The AP 1310 may then transmit the NDP 1314.

After the transmission of the NDP 1314, the AP 1310 may wait a timeout period (TO) 1319 to determine whether the first station, STA 1320, in the user list of the NDP announcement frame 1312 will respond to the NDP with its beamforming report 1324. The duration of the TO period 1319 may be the time at which the PHY signaling field would have been received and decoded. In the present embodiment, the STA 1320 is a slow responder and is unable to generate and transmit the beamforming report 1324 within the TO period 1319. In response, the STA 1320 determines to wait until the transmission of the beamforming report poll 1316 to generate and transmit the beamforming report 1324.

After the TO period 1319 expires, the AP 1310 determines that the STA 1320 is a slow responder and determines to transmit the beamforming report poll 1316 to the STA 1320 to trigger transmission of the beamforming report 1324 and the STA 1324 responds with the beamforming report 1324. In some embodiments, if the STA 1324 did not respond, the AP 1310 may skip the STA 1320 for this beamforming frame exchange sequence.

The STAs 1320 and 1330 may begin to calculate their respective beamforming reports after the transmission of the NDP 1314. The calculation time 1322 indicates the amount of time that the STA 1320 has to calculate the beamforming report 1324 and the calculation time 1332 illustrates the amount of time that STA 1330 has to calculate the beamforming report 1334.

After receiving the beamforming report 1324 from the STA 1320, the AP 1310 may transmit a beamforming report poll 1318 to the STA 1330 to trigger transmission of the beamforming report 1334. Thereafter, the STA 1330 may transmit the beamforming report 1334.

Figure 2:
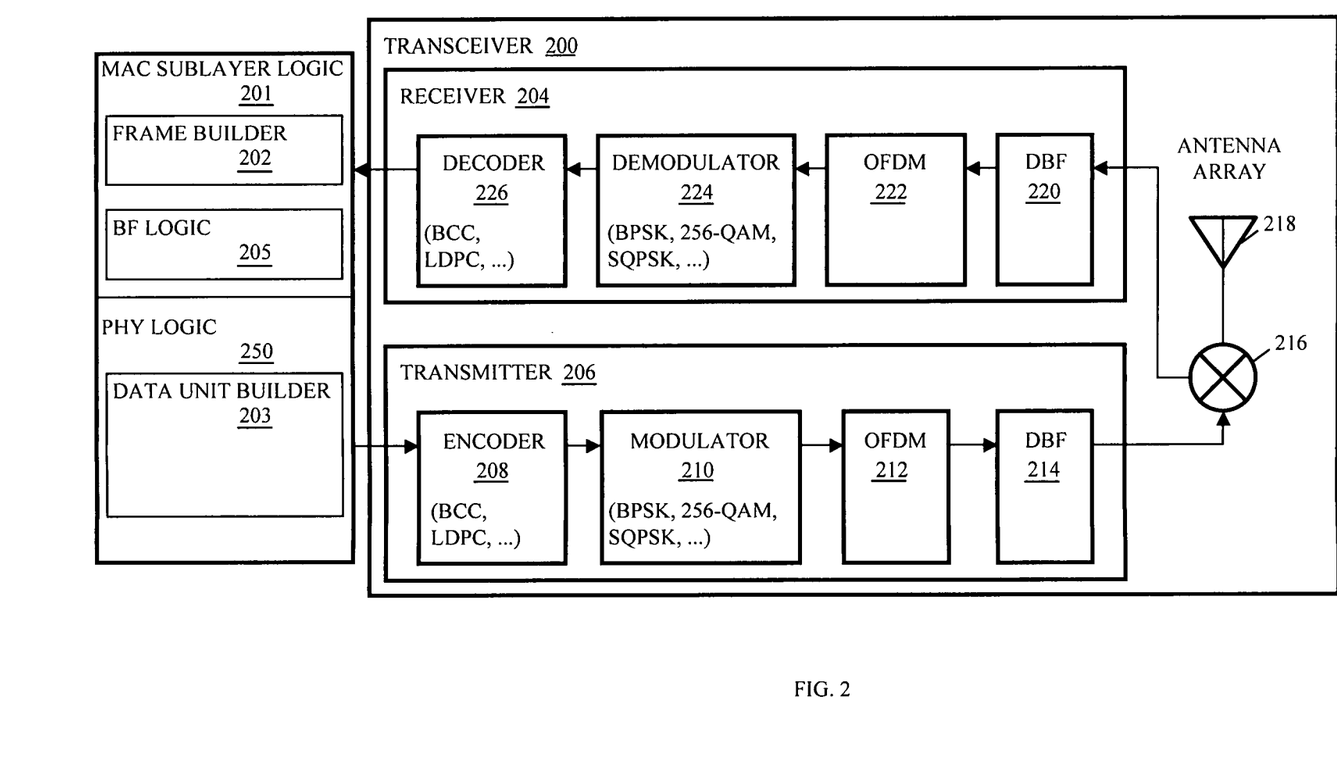
FIG. 2 depicts an embodiment of an apparatus to generate, transmit, receive and interpret a beamforming frame.

FIG. 2 depicts an embodiment of an apparatus to generate, transmit, receive, and interpret or decode frames such as the management frame 1200 illustrated in FIG. 1B. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 coupled with beamforming (BF) logic 205 such as BF report retrieval logic 1013 and/or BF report transmission logic 1033 illustrated in FIG. 1 to generate frames for beamforming frame exchange sequences such as the beamforming frame exchange sequences illustrated in FIGS. 1A and 1C. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device. In the present embodiment, the data unit builder 203 may be responsive to an indication from the BF logic 204 to generate and transmit an NDP.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 201 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beamforming may be integrated with orthogonal frequency division multiplexing.

The MAC sublayer logic 201 may decode or parse the MPDU or MPDUs to determine the particular type of frame or frames such as the NDP announcement frame, beamforming report frames, beamforming report poll frames, and the like included in the MPDU(s).

Figure 3A:
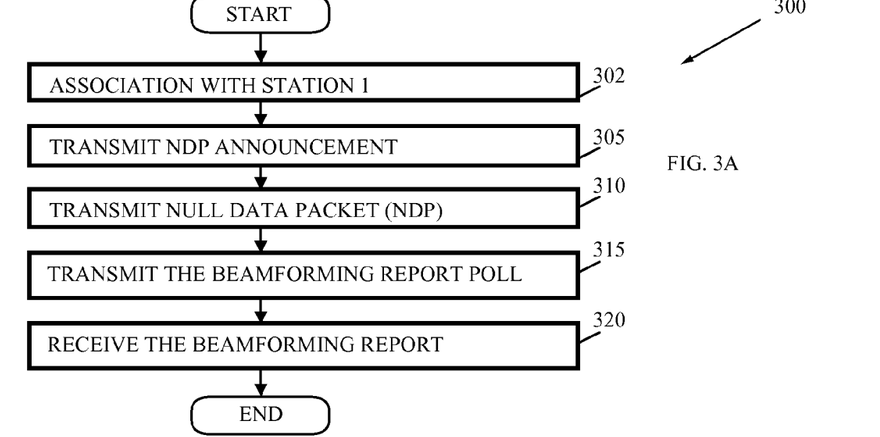
FIGS. 3A-C depict embodiments of flowcharts frame exchange sequences for beamforming training.
Figure 3B:
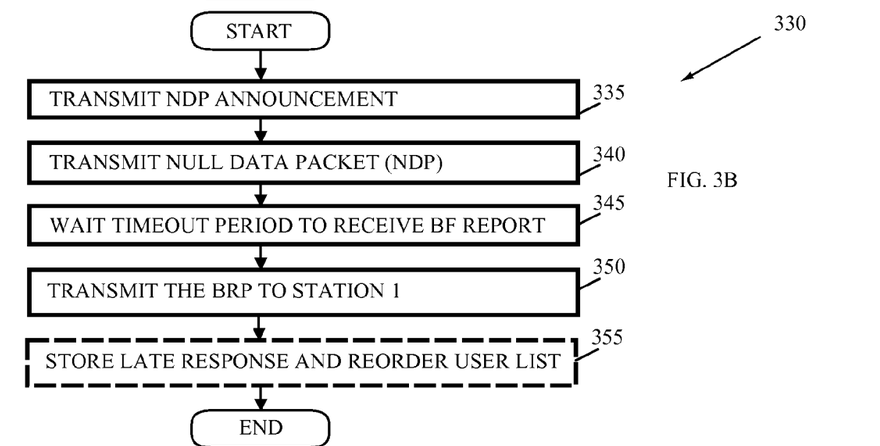

FIGS. 3A-B depict embodiments of flowcharts 300 and 350 to transmit, receive, decode, parse, and interpret communications with frames for frame exchange sequences for beamforming training as illustrated in FIGS. 1A-C. Referring to FIG. 3A, the flowchart 300 may begin with association with station 1 (element 302). For instance, a station may request association with an AP. In the association request, the station may include an extended capabilities information element and the extended capabilities information element may comprise a slow beamforming report responder bit to indicate whether or not the station is a slow beamforming report responder. In several embodiments, if the station does not set the slow beamforming report responder bit or does not include the capability in a communication with the AP, the AP may determine that the station is a fast beamforming report responder. In other embodiments, stations do not include a slow beamforming report responder bit in a frame during communications with the AP.

After associating with the station 1, the MAC logic generates a null data packet (NDP) announcement frame, the physical layer logic may receive the frame, and the physical layer may encapsulate and transmit the NDP announcement frame (element 305). The MAC logic may determine the order of the stations based upon the receipt of the slow beamforming report responder bits from the stations associated with the AP. In some embodiments, the AP will assign a fast beamforming report responder to the first position in the user list of the NDP announcement frame so the station has sufficient time to generate and transmit a beamforming report. However, if the MAC logic is unable to assign a fast beamforming report responder to the first position in the user list, a slow beamforming report responder is assigned to the position and the AP may determine to transmit a beamforming report poll to the first station to trigger transmission of the beamforming report.

After transmitting the NDP announcement, the AP may transmit the NDP (element 310) and after, e.g., an interframe space, the AP may transmit the beamforming report poll (element 315). In response to receiving the beamforming report poll, the slow beamforming report responder may respond with transmission of the beamforming report and the AP may receive the beamforming report (element 320).

Referring to FIG. 3B, the flowchart 330 begins with a receiver of a station such as the MAC logic of an AP generating and transmitting an NDP announcement frame (element 335). In the present embodiment, the MAC logic may be unaware of slow beamforming report responders so the MAC logic may determine an order for the stations in the user list of the NDP announcement frame in accordance with one or more other factors or randomly. The NDP announcement frame is transmitted to the stations to indicate that the beamforming sequence is beginning and the order of the stations responses are in accordance with a user list included in the NDP announcement frame.

The AP may then transmit the NDP (element 340). In some embodiments, the MAC logic of the AP may instruct the PHY logic to generate and transmit the NDP. In other embodiments, an NDP frame may be generated by the MAC logic and passed to the PHY logic for transmission as with other frames.

After the transmission of the NDP, the MAC logic may wait a timeout period to determine whether the first station in the user list of the NDP announcement frame will respond to the NDP with its beamforming report (element 345). If the first station in the user list is a fast responder, the first station may transmit the beamforming report to the AP within the timeout period and the AP may proceed by transmitting a beamforming report poll to the second station in the user list of the NDP announcement frame.

In the present embodiment, the first station is a slow responder and is unable to generate and transmit the beamforming report within the timeout period so the station may wait until the MAC logic transmits the beamforming report poll directed to the first station (element 350) or a subsequent beamforming report poll to generate and transmit the beamforming report to the AP. The MAC logic may determine to transmit the beamforming report poll directed to the first station (element 350) after the expiration of the timeout period.

In some embodiments, the MAC logic may store information related to late responses in memory such as the memory 1011 in FIG. 1 and use the information to reorder the stations in the user list (element 355). The MAC logic may store the information to learn behaviors of the stations such as which stations are slow responders and which stations are fast responders. The MAC logic may then reorder the user list to include a fast responder in the position of the first station.

Figure 3C:
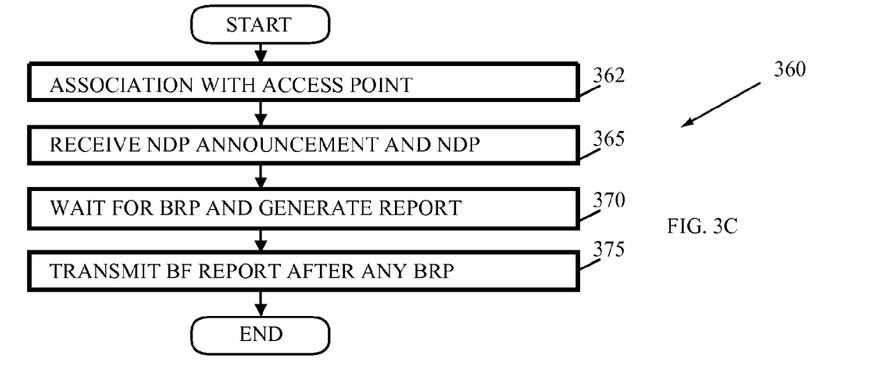

FIG. 3C depicts an embodiment of a flowchart 360 for a STA such as the communications device 1030 illustrated in FIG. 1. The flowchart 360 begins with association with an AP. The STA may transmit during association with the AP, information regarding whether the STA is slow or fast to respond with a beamforming report in an extended capabilities information element of a management frame such as an association request frame (element 362). The association process may be initiated by the STA to take advantages of services offered by the AP.

After associating with the AP, the STA may receive an NDP announcement followed by an NDP (element 365). The NDP announcement may include a user list to indicate that the STA is the first STA in the user list and thus the first station to respond with a beamforming report.

The STA may determine that the STA may be unable to respond with the beamforming report within the expected response time such as a timeout period so the STA may wait for a beamforming report poll. In response to the beamforming response poll, the STA may generate and transmit the beamforming report to the AP (element 370).

In other embodiments, the STA may receive the beamforming response poll, e.g., an interframe space after receiving the NDP and in response to the beamforming response poll, the STA may generate and transmit the beamforming report to the AP (element 370). In many embodiments, the STA may generate and transmit the beamforming report in response to any beamforming report poll and not just the beamforming report poll transmitted by the AP immediately following the NDP.

Figure 4A:
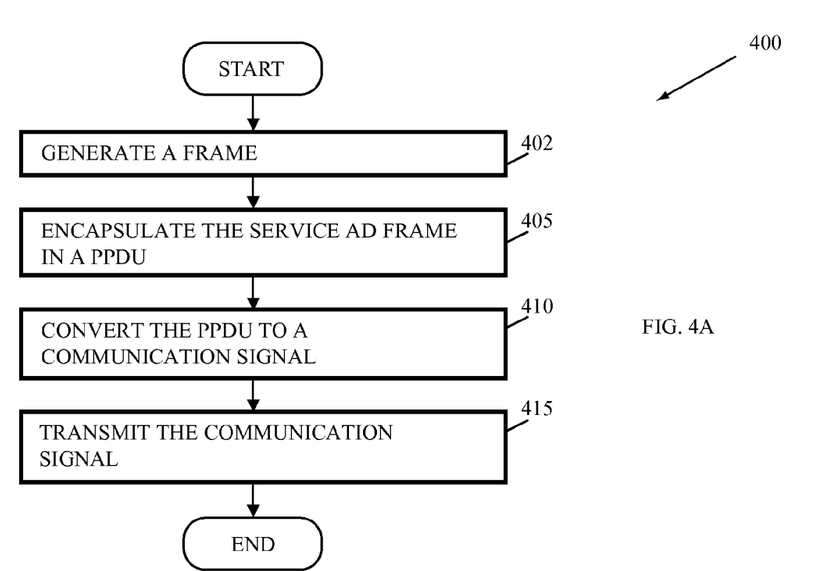
FIGS. 4A-B depict embodiments of flowcharts to generate, transmit, receive, parse, and interpret communications.
Figure 4B:
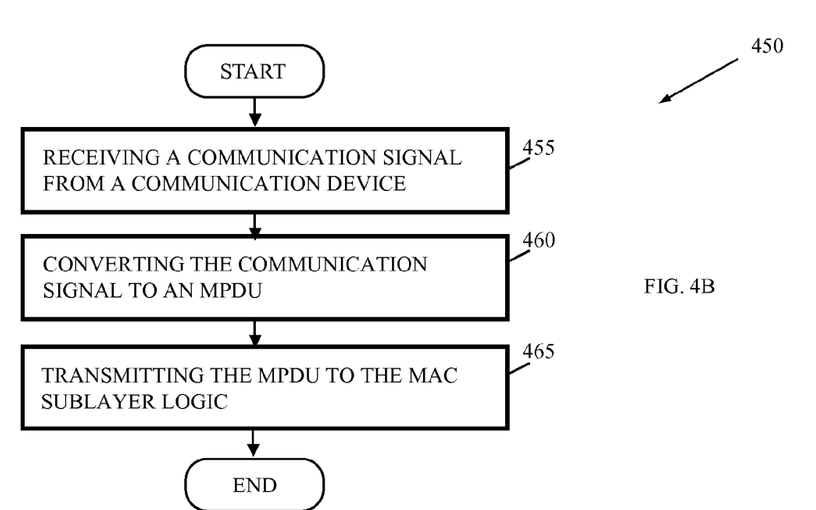

FIGS. 4A-B depict embodiments of flowcharts 400 and 450 to transmit, receive, decode, parse and interpret communications with frames such as the NDP announcement frame, beamforming report poll frame, beamforming report, or the like. Referring to FIG. 4A, the flowchart 400 may begin with generating a frame (element 402) in MAC logic of a communications device such as the communications device 1030 illustrated in FIG. 1. After the MAC logic generates the frame, the physical layer logic may receive the frame. The MAC logic of the communications device may pass the frame as an MPDU to a data unit builder that transforms the data into a packet that can be transmitted to a station. The data unit builder may generate a structure (an A-MPDU) to encapsulate one or more of the MPDUs from the frame builder to form a PPDU for transmission (element 405).

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the frame in each of the MPDUs. For instance, the MAC sublayer logic may parse and interpret the frame to determine the frame type and subtype as an NDP announcement frame and may parse the user field to determine the order in which an AP is requesting the transmission of beamforming reports.

The following examples pertain to further embodiments. One example comprises a method. The method may involve transmitting a null data packet for beamforming training; transmitting a beamforming report poll to a first station on a user list of stations associated with the beamforming training before receiving a transmission from the first station; and receiving a response after transmitting the beamforming report poll from the first station on the user list of stations.

In some embodiments, the method may further comprise transmitting, via an antenna, the null data packet. In some embodiments, the method may further comprise waiting for a timeout period after transmitting the null data packet to determine if the first station sends a beamforming report in response to the null data packet. In many embodiments, the method may further comprise storing an indication of the absence of a response to the null data packet from the first station on the user list in memory. In several embodiments, the method may further comprise modifying an order of stations on the user list to position another station as the first station on the user list. In several embodiments, receiving from the first station on the user list an indication that the first station on the user list is a slow beamforming report responder. In several embodiments, receiving during association with the first station on the user list and other stations on the user list, information regarding whether the stations are slow or fast to respond with a beamforming report, the information being transmitted in extended capabilities information elements. And, in some embodiments, selecting a fast beamforming report responder to be the first station on the user list.

Another example comprises an apparatus. The apparatus may comprise a physical layer logic; a medium access control logic coupled with the physical layer logic to transmit a null data packet for beamforming training; transmit a beamforming report poll to a first station on a user list of stations associated with the beamforming training before receiving a transmission from the first station; and receive a response after transmitting the beamforming report poll from the first station on the user list of stations.

In some embodiments, the apparatus may further comprise an antenna coupled with the physical layer logic to transmit the null data packet. In some embodiments, the apparatus may further comprise a memory coupled with the medium access control logic to store the user list. In some embodiments, the medium access control logic comprises logic to storing the absence of a response to the null data packet from the first station on the user list in memory. In some embodiments, the medium access control logic comprises logic to wait for a timeout period after transmitting the null data packet to determine if the first station sends a beamforming report in response to the null data packet. In some embodiments, the medium access control logic comprises logic to modify an order of the user list to position another station as the first station on the user list. In some embodiments, the medium access control logic comprises logic to receive from the first station on the user list an indication that the first station on the user list is a slow beamforming report responder. In some embodiments, the medium access control logic comprises logic to receive during association with the first station on the user list and other stations on the user list, information regarding whether the stations are slow or fast to respond with a beamforming report, the information being transmitted in extended capabilities information elements. And in some embodiments of the apparatus, the medium access control logic comprises logic to select a fast beamforming report responder to be the first station on the user list.

Another example comprises a system. The system may comprise a physical layer logic to encapsulate the NDP frame with a preamble; a memory; and a medium access control logic coupled with the physical layer logic to transmit a null data packet for beamforming training; transmit a beamforming report poll to a first station on a user list of stations associated with the beamforming training before receiving a transmission from the first station; and receive a response after transmitting the beamforming report poll from the first station on the user list of stations.

Another example comprises a method. The method may involve receiving, by a station, a null data packet announcement frame indicating that the station is first in a user list of stations from which an access point will request a beamforming report; receiving, by the station, a null data packet from an access point; receiving, by the station, a beamforming report poll; and transmitting a beamforming report in response to receipt of the beamforming report poll.

In some embodiments, the method may further comprise receiving, via an antenna, the null data packet announcement frame. In some embodiments, the method may further comprise associating with the access point, wherein associating comprises generating and transmitting a frame with an extended capabilities information element indicating that a station is slow to respond with a beamforming report. And, in some embodiments, transmitting a beamforming report in response to receipt of the beamforming report poll comprises waiting for the beamforming report poll based upon an inability to respond within a timeout period after receipt of the null data packet.

Another example comprises an apparatus. The apparatus may comprise a physical layer logic; a medium access control logic coupled with the physical layer logic to receive a null data packet announcement frame indicating that the medium access control logic is first in a user list of stations from which an access point will request a beamforming report; receive a null data packet from an access point; receive a beamforming report poll; and transmit a beamforming report in response to receipt of the beamforming report poll.

In some embodiments, the medium access control logic comprises logic to wait for the beamforming report poll based upon an inability to respond within a timeout period after receipt of the null data packet. And in some embodiments of the apparatus, the medium access control logic comprises logic to associate with the access point, wherein the medium access control logic to associate comprises logic to generate and transmit a frame with an extended capabilities information element indicating that a station is slow to respond with a beamforming report.

Another example comprises a program product. The program product for beamforming training may comprise a storage medium comprising instructions to be executed by a processor-based device, wherein the instructions, when executed by the processor-based device, perform operations, the operations comprising: transmitting a null data packet for beamforming training; transmitting a beamforming report poll to a first station on a user list of stations associated with the beamforming training before receiving a transmission from the first station; and receiving a response after transmitting the beamforming report poll from the first station on the user list of stations.

In some embodiments, the operations may further comprise waiting for a timeout period after transmitting the null data packet to determine if the first station sends a beamforming report in response to the null data packet. And, in some embodiments, the operations may further comprise modifying an order of the user list to position another station as the first station on the user list.

Another example comprises a program product. The program product for beamforming training may comprise a storage medium comprising instructions to be executed by a processor-based device, wherein the instructions, when executed by the processor-based device, perform operations, the operations comprising: receiving, by a station, a null data packet announcement frame indicating that the station is first in a user list of stations from which an access point will request a beamforming report; receiving, by the station, a null data packet from an access point; receiving, by the station, a beamforming report poll; and transmitting a beamforming report in response to receipt of the beamforming report poll.

In some embodiments, the operations may further comprise associating with an access point, wherein associating comprises generating and transmitting a frame with an extended capabilities information element indicating that a station is slow to respond with a beamforming report. And, in some embodiments, waiting for the beamforming report poll based upon an inability to respond within a timeout period after receipt of the null data packet.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to generate a user list for beamforming training, the method comprising:
   receiving, during association with one or more stations, a management frame from each of the one or more stations, the management frame comprising a frame body, the frame body comprising an information element, the information element comprising a responder bit, the responder bit to indicate if a station is a slow responder
   determining, based upon the management frame received from each of the one or more stations, if the responder bit is set to determine if each of the one or more stations is a slow responder or a fast responder; and
   generating a user list of the one or more stations from which to obtain beamforming reports, wherein generating the user list comprises:
      assigning a slow responder as a first station in the user list if all of the one or more stations are slow responders; and
      assigning a fast responder as the first station in the user list if at least one of the one or more stations is a fast responder;
   transmitting a null data packet (NDP) announcement frame, wherein the NDP announcement frame comprises an indication of the order of responses from the one or more stations in accordance with the user list;
   transmitting an NDP;
   waiting a timeout period for a response from a first station in the user list; and
   transmitting a beamforming report poll to the first station immediately after expiration of the timeout period if the first station does not respond to the NDP during the timeout period.

2. The method of claim 1, further comprising: in response to assigning the slow responder as the first station, determining to transmit a beamforming report poll to the first station to trigger transmission of a beamforming report from the first station; the null data packet announcement frame to identify the first station; wherein transmitting the beamforming report poll comprises transmitting the beamforming report poll to the first station on the user list before receiving a transmission from the first station; and receiving a response from the first station on the user list after transmitting the beamforming report poll.

3. The method of claim 1, wherein waiting the timeout period comprises waiting the timeout period after transmitting the packet NDP to determine if the first station sends a beamforming report in response to the NDP.

4. The method of claim 1, further comprising storing an indication of the absence of a response to the NDP from the first station on the user list in memory.

5. The method of claim 1, further comprising modifying an order of stations on the user list to position another station as the first station on the user list.

6. The method of claim 1, further comprising receiving from the first station on the user list an indication that the first station on the user list is a slow beamforming report responder.

7. The method of claim 1, further comprising selecting a fast beamforming report responder to be the first station on the user list.

8. A device to generate a user list for beamforming training, the device comprising:
   a physical layer logic;
   a medium access control logic coupled with the physical layer logic to receive, during association with one or more stations, a management frame from each of the one or more stations, the management frame comprising a frame body, the frame body comprising an information element, the information element comprising a responder bit, the responder bit to indicate if a station is a slow responder; to determine, based upon the management frame received from each of the one or more stations, if the responder bit is set to determine if each of the one or more stations is a slow responder or a fast responder; and to generate a user list of the one or more stations from which to obtain beamforming reports, wherein generation of the user list comprises: assignment of a slow responder as a first station in the user list if all of the one or more stations are slow responders and assignment of a fast responder as the first station in the user list if at least one of the one or more stations is a fast responder; to transmit a null data packet (NDP) announcement frame, wherein the NDP announcement frame comprises an indication of the order of responses from the one or more stations in accordance with the user list; to transmit an NDP; to wait a timeout period for a response from a first station in the user list; and to transmit a beamforming report poll to the first station immediately after expiration of the timeout period if the first station does not respond to the NDP during the timeout period.

9. The device of claim 8, wherein the medium access control logic comprises:
   a medium access control logic to determine, in response to assignment of the slow responder as the first station, to transmit a beamforming report poll to the first station to trigger transmission of a beamforming report from the first station; the null data packet announcement frame to identify the first station; transmission of the beamforming report poll to the first station on the user list to occur before receiving a transmission from the first station; and to receive a response from the first station on the user list after transmitting the beamforming report poll.

10. The device of claim 8, further comprising a processor, radio, and one or more antennas coupled with the physical layer logic to transmit the null data packet.

11. The device of claim 8, further comprising a memory coupled with the medium access control logic to store the user list.

12. The device of claim 8, wherein the medium access control logic comprises logic to wait the timeout period after transmitting the NDP to determine if the first station sends a beamforming report in response to the NDP.

13. The device of claim 8, wherein the medium access control logic comprises logic to modify an order of the user list to position another station as the first station on the user list.

14. The device of claim 8, wherein the medium access control logic comprises logic to select a fast beamforming report responder to be the first station on the user list.

15. A machine-accessible product comprising:
  a non-transitory medium containing instructions to perform beamforming training, wherein the instructions, when executed by an access point, causes the access point to perform operations, the operations comprising:
    receiving, during association with one or more stations, a management frame from each of the one or more stations, the management frame comprising a frame body, the frame body comprising an information element, the information element comprising a responder bit, the responder bit to indicate if a station is a slow responder;
    determining, based upon the management frame received from each of the one or more stations, if the responder bit is set to determine if each of the one or more stations is a slow responder or a fast responder; and
    generating a user list of the one or more stations from which to obtain beamforming reports, wherein generating the user list comprises:
      assigning a slow responder as a first station in the user list if all of the one or more stations are slow responders; and
      assigning a fast responder as the first station in the user list if at least one of the one or more stations is a fast responder;
    transmitting a null data packet (NDP) announcement frame, wherein the NDP announcement frame comprises an indication of the order of responses from the one or more stations in accordance with the user list;
    transmitting an NDP;
    waiting a timeout period for a response from a first station in the user list; and
      transmitting a beamforming report poll to the first station immediately after expiration of the timeout period if the first station does not respond to the NDP during the timeout period.

* * * * *